United States Patent [19]
Butler et al.

[11] 3,995,000
[45] Nov. 30, 1976

[54] CERAMIC NUCLEAR FUEL PELLETS
[75] Inventors: Gregg Glenn Butler; Ronald Henry Watson, both of Kirkham, England
[73] Assignee: British Nuclear Fuels Limited, England
[22] Filed: Jan. 11, 1974
[21] Appl. No.: 432,600

[30] Foreign Application Priority Data
Jan. 12, 1973   United Kingdom................. 1666/73
May 18, 1973   United Kingdom............... 23794/73

[52] U.S. Cl................................ 264/.5; 176/66; 176/89
[51] Int. Cl.² ..................... G21C 21/02; G21C 3/00
[58] Field of Search ................... 176/66, 89; 264/.5; 75/222

[56] References Cited
UNITED STATES PATENTS
1,988,861   1/1935   Thorausch et al. ................... 75/222
3,322,535   5/1967   Rao...................................... 75/222
3,739,048   6/1973   Morita................................. 264/.5

Primary Examiner—Charles T. Jordan
Attorney, Agent, or Firm—Larson, Taylor and Hinds

[57] ABSTRACT
Low density nuclear fuel pellets are produced by mixing uranium dioxide powder and/or plutonium dioxide powder with ammonium oxalate, forming the mixture into pellets and sintering the pellets.

1 Claim, 2 Drawing Figures

CERAMIC NUCLEAR FUEL PELLETS

This invention relates to the production of ceramic nuclear fuel pellets.

BACKGROUND OF THE INVENTION

For the production of low density nuclear fuel pellets of uranium dioxide, plutonium dioxide or mixtures of uranium dioxide and plutonium dioxide two basic methods of achieving low densities are feasible. The first entails the production of an oxide containing the correct amount of potential energy such that the desired density is achieved after sintering at the chosen time and temperature profile in the sintering furnace. The second method entails the production of a standard quality of dioxide powder which sinters to a higher density than that required and the incorporation in pellets of the dioxide powder of the requisite amount of a removable additive which will induce the correct amount of porosity within the pellets after sintering.

SUMMARY OF THE INVENTION

The present invention consists in the production of nuclear fuel pellets, the production including the steps of incorporating into a powder mixture ammonium oxalate powder and either uranium dioxide powder or plutonium dioxide powder or both uranium dioxide and plutonium dioxide powder, forming the mixture into pellets and sintering the pellets.

The present invention also consists in a powder mixture and pellets of ammonium oxalate and either uranium dioxide or plutonium dioxide or both uranium dioxide and plutonium dioxide.

Various materials have been suggested as removable additives for influencing the density of uranium dioxide fuel pellets. Advantages of the use of ammonium oxalate are its effectiveness in producing a large range of pore sizes over a wide density range, its predictable behaviour because its presence does not change the sintering characteristics of the nuclear fuel pellet, its good handling qualities and its ease of removal, the gas evolution rate at the decomposition temperature being such that pellet cracking or fragmentation does not occur when the pellets containing the additive are processed under the commonly used conditions for nuclear fuel production. Further, no debonding process is necessary to effect complete additive removal, nor do the additive decomposition products, even under adverse processing conditions, inhibit the removal of impurities such as fluorine, which are normally eliminated in the sintering.

DESCRIPTION OF DRAWINGS AND EXAMPLES

The use of ammonium oxalate as a removable additive for uranium dioxide pellets is exemplified by the following experiments for which the results are depicted in the accompanying graphs (FIGS. 1 and 2).

Uranium dioxide was milled for one hour in a laboratory ball mill and then blended with 63–75 $\mu$m or 75–105 $\mu$m ammonium oxalate. Thirteen blends were made with quantities of ammonium oxalate varying between 1.76 and 60% by volume. Similar blends of uranium dioxide powder and 7.1% by volume ammonium oxalate were made with the ammonium oxalate in 11 size ranges between 10 and 300 $\mu$m.

Pellets were manufactured from all the above blends using a binderless technique. Granulation of the powders was achieved by pre-compaction (at 0.75 te/cm²) and pellets were pressed at 4 te/cm². The pellets were sintered using a temperature profile which gave 1 hour at the peak temperature of 1625° C and were recycled through the sintering step to give further hourly periods at peak temperature.

The densities of all the pellets produced were measured. Both immersion and geometric densities were obtained and were found to be in agreement, indicating none of the pellets contained connected porosity. The results are plotted on the accompanying graphs.

Figure 1:
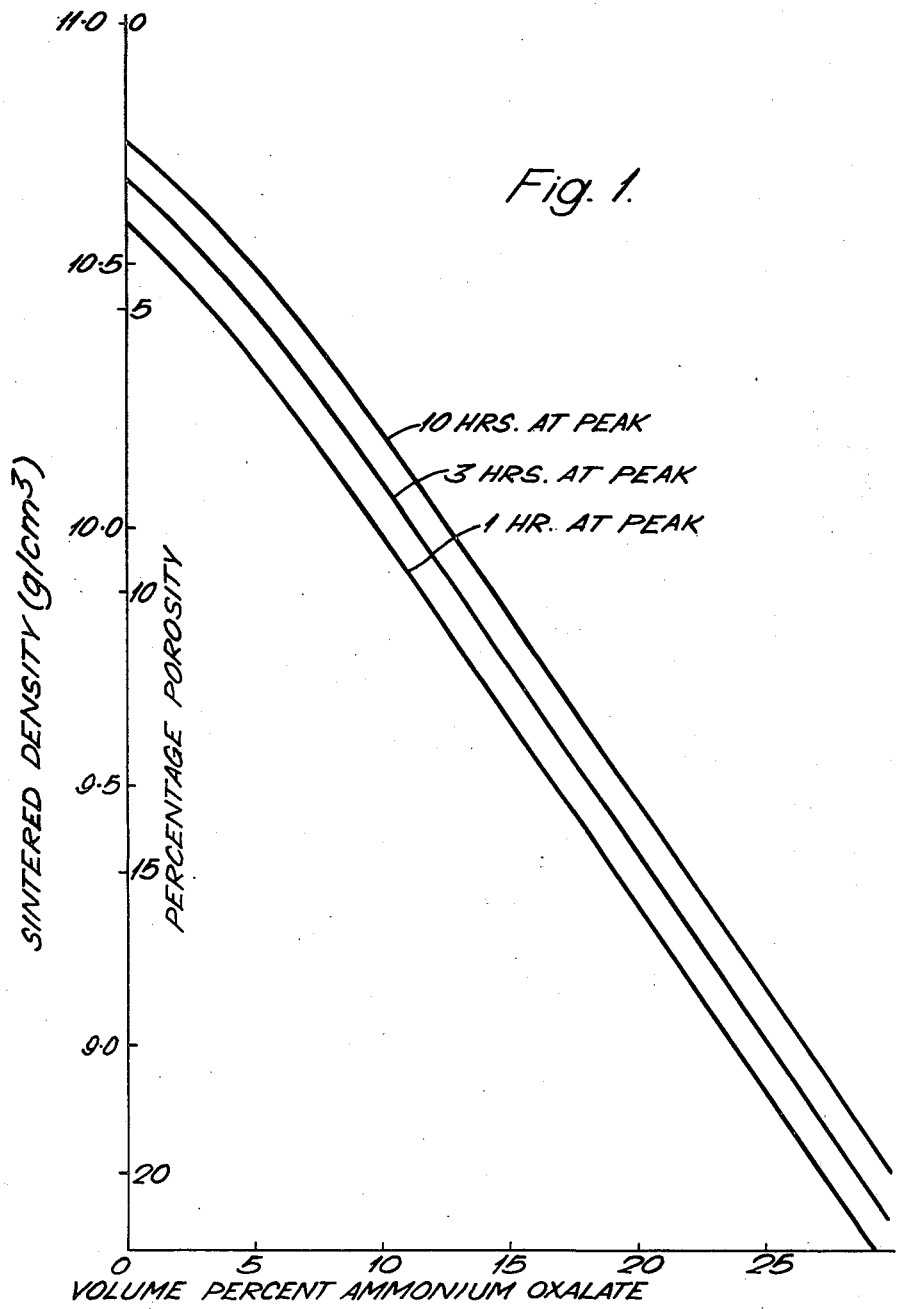
FIG. 1 shows the effect of the amount of ammonium oxalate addition on density
Figure 2:
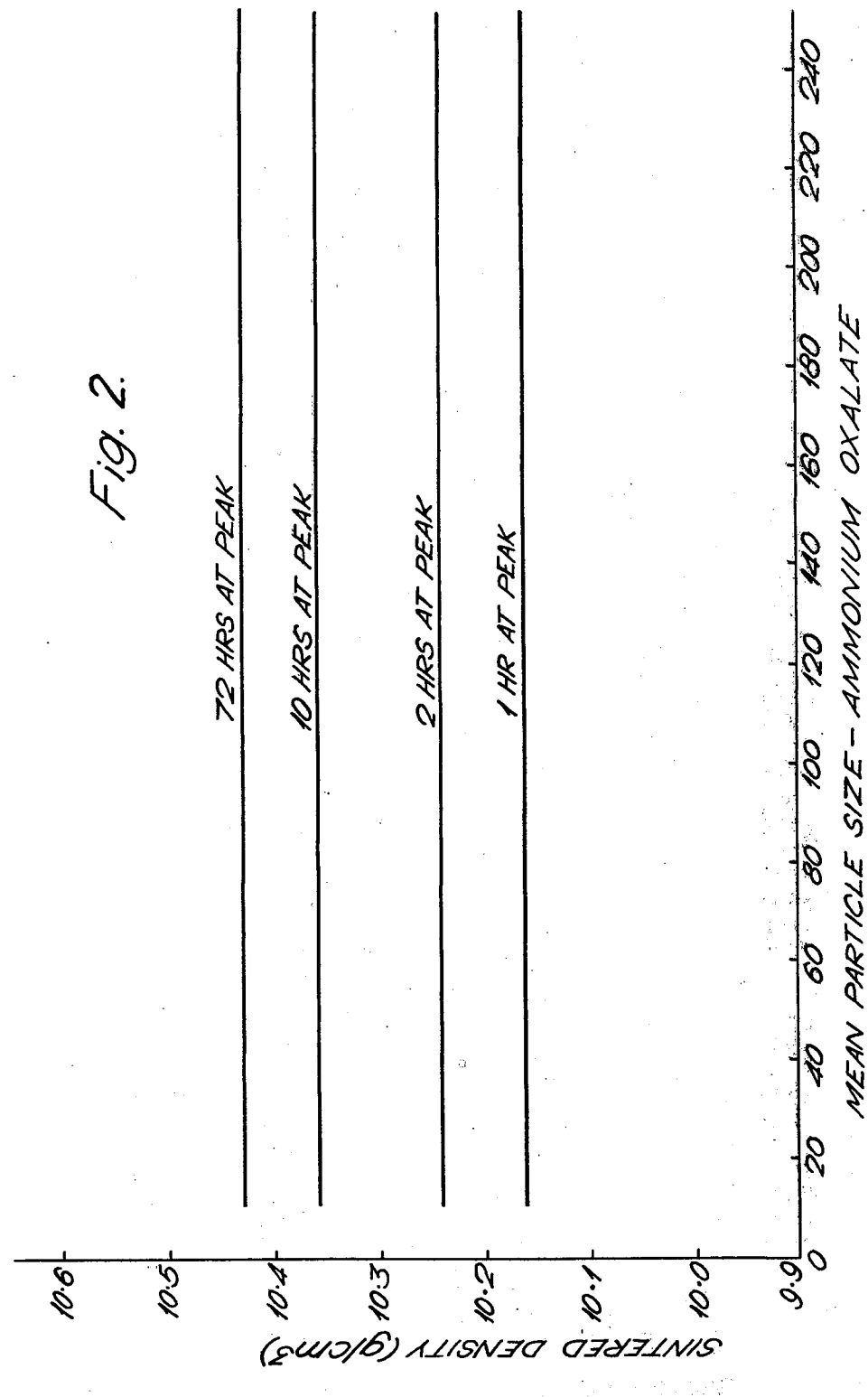
FIG. 2 shows the effect of the particle size of the ammonium oxalate on density.

Nuclear fuel pellets of controlled density may be obtained in the same way with plutonium dioxide replacing all or part of the uranium dioxide.

The following is an example of one way of carrying the invention into effect with mixed uranium dioxide/plutonium dioxide.

Uranium dioxide powder and plutonium dioxide powder were dry blended in a ball mill. The resultant mixture was hand-blended with 1.7% by weight of ammonium oxalate in the size range 20 – 50 $\mu$m, and then granulated with a binder and compacted into pellets. The pellets were debonded in carbon dioxide at 800° C and sintered in a 4% hydrogen/argon mixture at 1650° C. The density of the sintered pellets was 91.5% of the theoretical density and the mean pore size was about 30 $\mu$m.

The advantages attendant on the use of ammonium oxalate as a removable additive in accordance with the invention are made evident in the two following examples.

1. Dextrin, starch, sucrose and ammonium oxalate were blended into milled uranium dioxide in quantities calculated to give a density of 9.8 g/cm³ when granulated by a binder route, pressed to 6.4 g/cm³ debonded in carbon dioxide at 800° C and sintered at 1625° C for 4 hours.

The pellets using sucrose contained significant amounts of connected porosity and had a density gradient, being of low density in the centre. The pellets using dextrin and starch were free of connected porosity but contained many cracks up to 1 mm long emanating from the induced porosity on a plane parallel to the pellet end face.

The pellets using ammonium oxalate exhibited no cracking, connected porosity or inhomogeneity when processed under the same conditions.

2. The additives and oxide chosen for the first example were used to make binderless pellets sintering to 8 g/cm³ after pressing at 6 te/cm² and sintering at 1625° C for 4 hours with no debonding treatment. The sucrose containing pellets fragmented and showed large amounts of cracking and some connected porosity. The starch containing pellets gave large cracks and lamination of the pellets. (By lamination is meant a discontinuity substantially parallel to an end face of a pellet). The dextrin additive pellets remained intact but also showed cracking and inhomogeneity, with some areas of very low density. The pellets which contained ammonium oxalate, however, were homogeneous and without cracks, and contained no connected porosity.

We claim:

1. A method of producing nuclear fuel pellets comprising the steps of:
    providing a mixture of ammonium oxalate powder and at least one powdered nuclear fuel material selected from the group consisting of uranium dioxide and plutonium dioxide;
    forming said mixture into pellets; and
    sintering said pellets to form sintered, homogeneous, nuclear fuel pellets.

* * * * *